United States Patent [19]

Takahashi

[11] 4,436,173

[45] Mar. 13, 1984

[54] SHAFT DRIVE APPARATUS FOR MOTORIZED TWO-WHEELED VEHICLE

[75] Inventor: Hirotake Takahashi, Sayama, Japan

[73] Assignee: Honda Giken Kogyo Kabushiki Kaisha, Tokyo, Japan

[21] Appl. No.: 377,908

[22] Filed: May 13, 1982

[30] Foreign Application Priority Data

| May 15, 1981 | [JP] | Japan | 56-72155 |
| May 15, 1981 | [JP] | Japan | 56-72156 |
| May 16, 1981 | [JP] | Japan | 56-71161[U] |
| May 19, 1981 | [JP] | Japan | 56-72206[U] |
| May 19, 1981 | [JP] | Japan | 56-72207[U] |

[51] Int. Cl.³ .................. B62M 17/00; B62M 25/28
[52] U.S. Cl. .................................. 180/226; 280/260; 464/57
[58] Field of Search ................ 180/226; 280/260; 464/57, 58, 160, 180

[56] References Cited

U.S. PATENT DOCUMENTS

| 2,077,628 | 4/1937 | Jordan | 180/226 |
| 2,616,274 | 11/1952 | Landrum | 464/57 |
| 3,861,715 | 1/1975 | Mendoza | 280/260 |

FOREIGN PATENT DOCUMENTS

| 2616101 | 10/1977 | Fed. Rep. of Germany | 180/226 |
| 349406 | 3/1905 | France | 180/226 |
| 55-78854 | 6/1980 | Japan | |

Primary Examiner—Joseph F. Peters, Jr.
Assistant Examiner—Donn McGiehan
Attorney, Agent, or Firm—Armstrong, Nikaido, Marmelstein & Kubovcik

[57] ABSTRACT

An improvement in a shaft drive apparatus which is an outer casing extending over an liquid-tightly enclosing a torque damper on a propeller shaft which interconnects the output shaft of an internal combustion engine to a bevel gear mechanism on the rear wheel of a motorized two-wheeled vehicle. The casing is attached to the propeller shaft to rotate therewith. An outer covering can cover a universal joint which interconnects the torque damper and the input shaft of the bevel gear mechanism. The outer cover extends over and liquid-tightly surrounds the universal joint and engages the outer casing and has its interior in communication with an interior of the outer casing. The interior of the bevel gear casing can also communicate with the interior of the outer casing.

19 Claims, 10 Drawing Figures

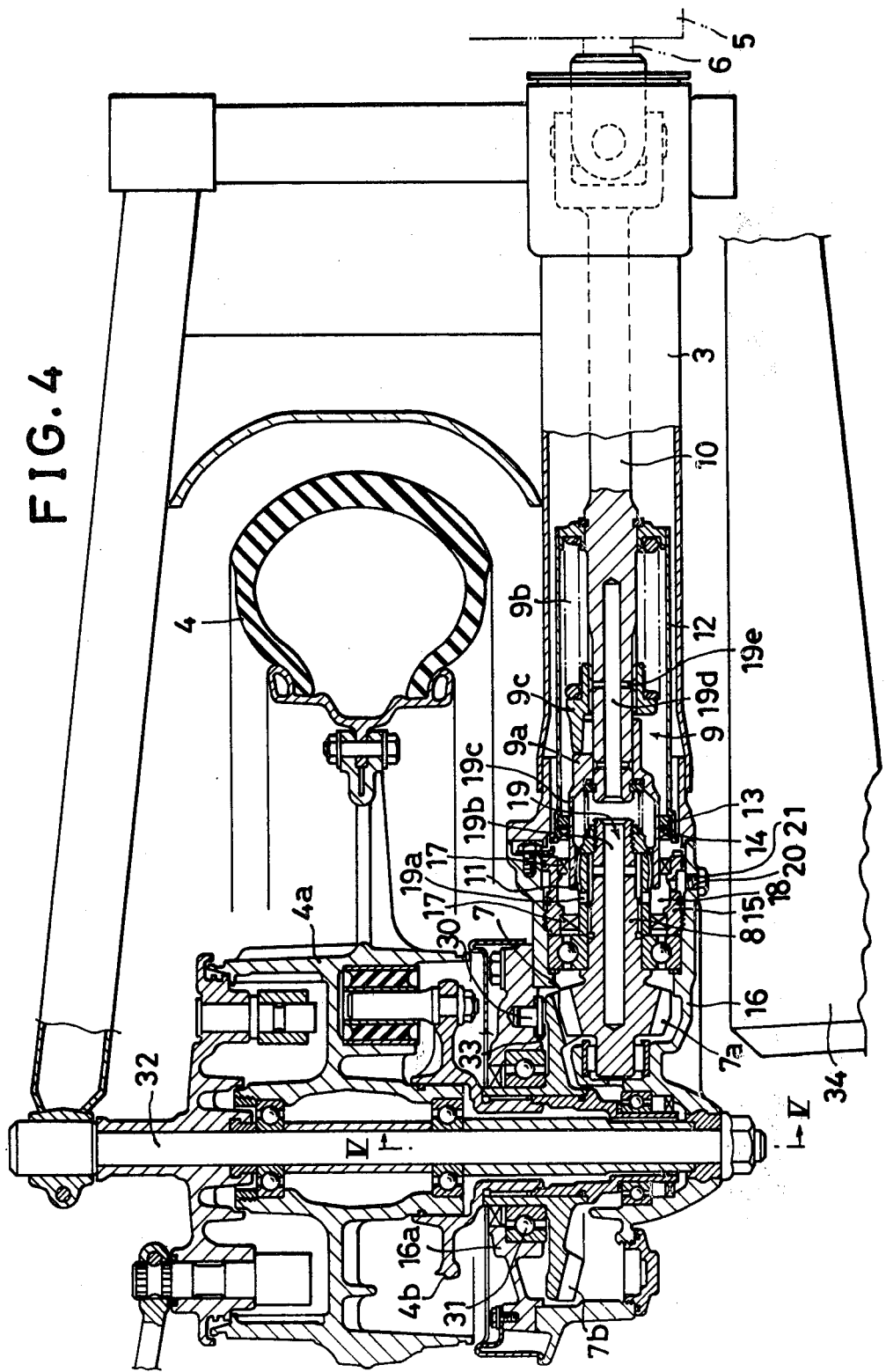

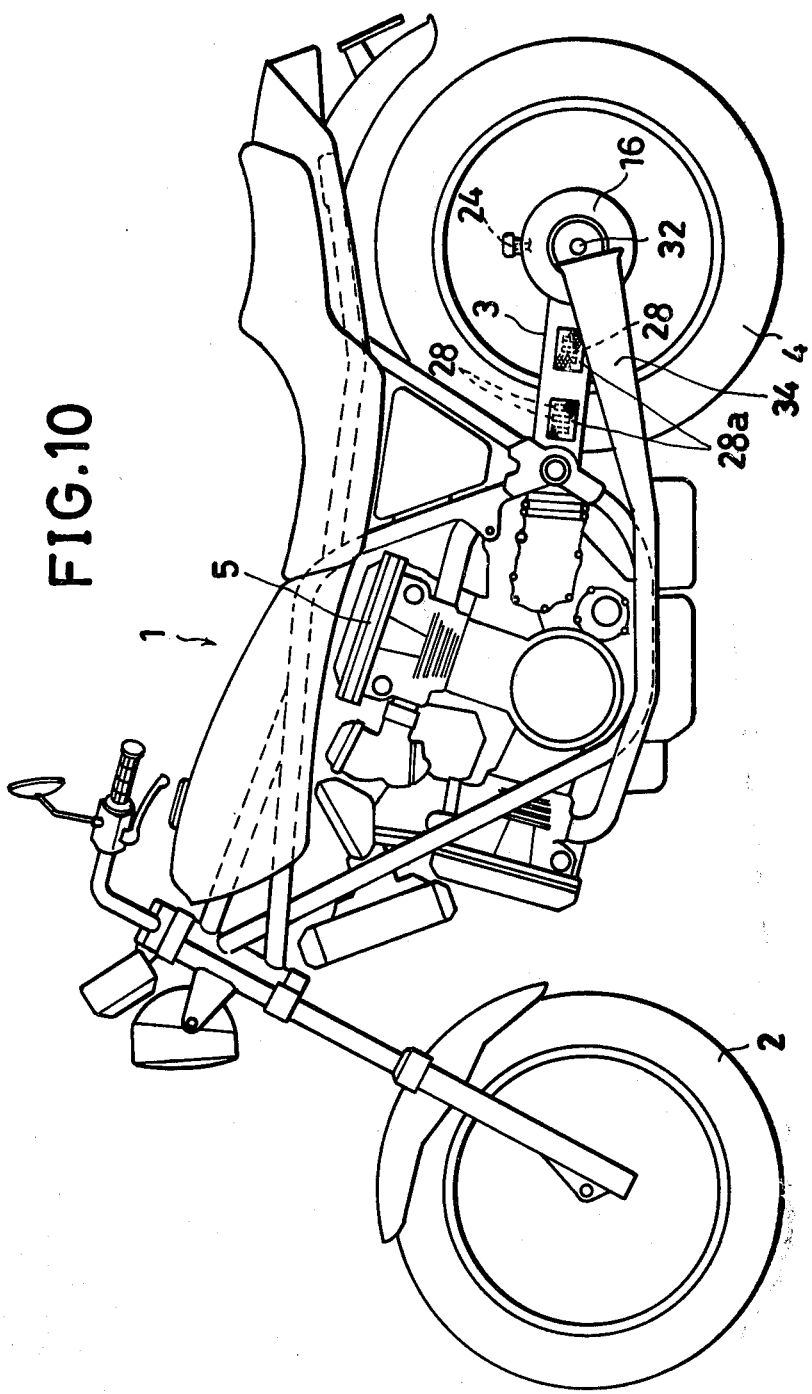

SHAFT DRIVE APPARATUS FOR MOTORIZED TWO-WHEELED VEHICLE

BACKGROUND OF THE INVENTION

1. Field of the Invention

This invention relates to a shaft drive apparatus for a rear wheel in a motorized two-wheeled vehicle such as a motorcycle or the like.

2. Description of the Prior Art

An example of a known shaft-drive apparatus is shown in FIG. 1 and comprises, for instance, an output shaft b connected to an internal combustion engine a through a propeller shaft f extending through the interior of a rear fork d and a torque damper e to an input shaft c of a bevel gear mechanism connected to a rear wheel. It has been usual with this type of drive that the damper e is lubricated with oil g stored in the rear fork d as shown in the Figure. Consequently, certain problems can result, such as the oil being moved forwards along the fork d because of an inclination of the rear fork. The oil g then is introduced into a boot h provided on the front end portion of the rear fork d. This changes the oil level, which is undesirable. Additionally, the oil can leak from the boot h.

OBJECTS AND SUMMARY OF THE INVENTION

It is an object of the present invention to provide a shaft drive apparatus for a motorized two-wheeled vehicle wherein the oil level provided for the shaft drive apparatus will remain substantially constant.

It is the further object of the present invention to provide a shaft drive apparatus in which the possibility for the leakage of the oil is minimized.

It is yet a further object of the present invention to provide a shaft drive apparatus where the oil for the bevel gear mechanism is utilized in common with the oil for the universal joint and for the torque damper.

These and other objects, which will be readily apparent to a person of ordinary skill in the art, are attained in an improvement in a shaft drive apparatus in a two-wheeled vehicle. The vehicle includes a vehicle body having a middle portion, a front wheel mounted on the body, a rear fork mounted on the body, an internal combustion engine having an output shaft mounted on the middle portion and a rear wheel mounted on the rear fork. The shaft drive apparatus includes a bevel gear mechanism having a gear casing and an input shaft connected to the rear wheel, a propeller shaft having opposite ends, with one end connected to the output shaft and the other end extending axially into the rear fork, and a torque damper interconnecting the other end to the input shaft. The improvement comprises an outer casing extending over and liquid-tightly enclosing the torque damper with the casing being attached to the propeller shaft to rotate therewith.

The apparatus can further comprise a universal joint interconnecting the torque damper and the input shaft having an outer cover extending over and sealed-tight surrounding the universal joint. The outer cover engages the outer casing and has an interior in communication with an interior of the outer casing.

The gear casing can have an interior in communication with the interior of the outer casing.

The torque converter can include a lifter slidably mounted on a propeller shaft having an outer peripheral surface in sliding contact with an inner peripheral surface of the outer casing, and an orifice opening extending therethrough. In this manner, the lifter acts as a hydraulic shock to further absorb the torque fluctuation.

A ventilation gap can be formed between the outer peripheral surface of the outer casing and an inner peripheral surface of the rear fork. The rear fork can be provided with at least one ventilation opening for introducing external air into the ventilation gap.

The outer casing can include radially extending radiation fins on the outer periphery thereof.

A bevel mechanism can comprise a pinion gear connected to the input shaft, a bevel gear meshed with the pinion gear and connected to the rear wheel. The pinion gear and the bevel gear are positioned in the gear casing such that the bevel gear is axially inwardly of the pinion gear relative to the rear wheel. The gear casing can include a covering member extending to cover the bevel gear on the side between the bevel gear and the rear wheel. The covering member can have mounted therein a restriction member for restricting the axial deflection of the bevel gear.

The restriction member can comprise an outer annular member of a rolling bearing carried by the covering member.

BRIEF DESCRIPTION OF THE DRAWINGS

FIG. 4 is a sectional plan view of the present invention;

FIG. 10 is a side view of another embodiment of the present invention.

DETAILED DESCRIPTION OF PREFERRED EMBODIMENTS

Figure 1:
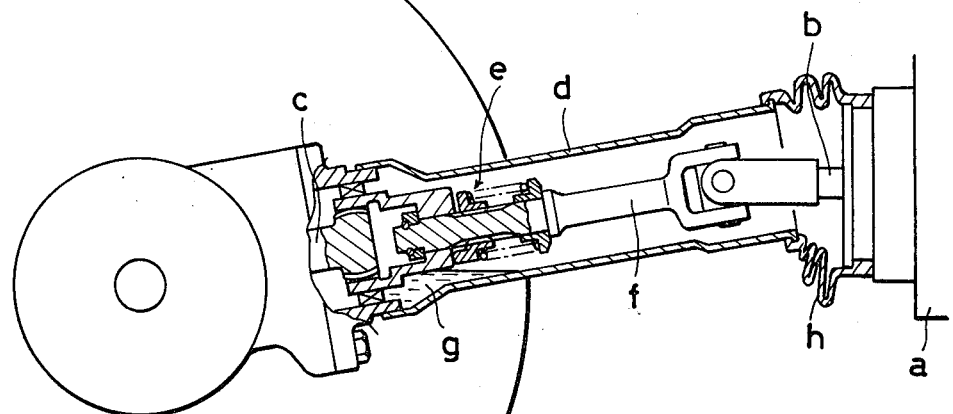
FIG. 1 is a diagrammatic view of a conventional shaft drive apparatus.
Figure 3:
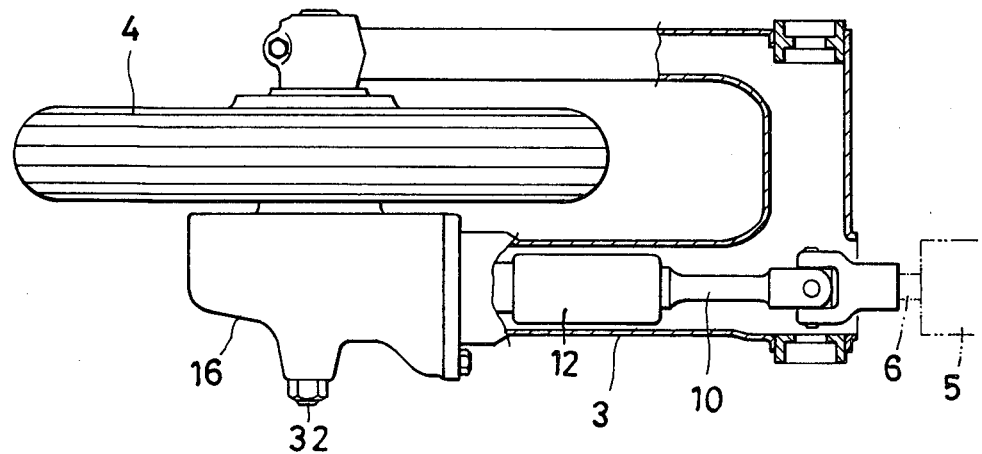
FIG. 3 is a partial cross-sectional plan view of the present invention and a portion of the motorcycle that it is mounted upon.
Figure 2:
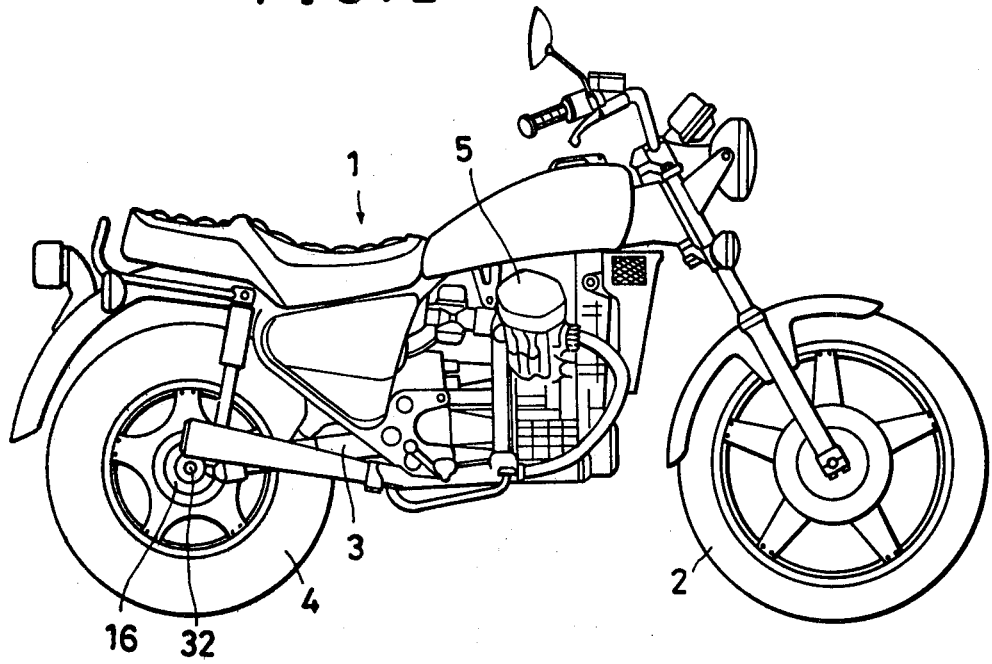
FIG. 2 is a side view of a motorized two-wheeled vehicle having one embodiment of the present invention.

The above and other objects and the attendant advantages of the present invention will become readily apparent by reference to the following detailed description, when considered in conjunction with the accompanying drawings.

Referring to FIGS. 2-6 showing a first embodiment of this invention, a vehicle body 1 of a motorized two-wheeled vehicle has a front wheel 2 and a rear wheel 4 connected thereto through a rear fork 3. An internal combustion engine 5 is mounted on the middle portion of the vehicle body 1. As shown clearly in FIGS. 3 and 4, an output shaft 6 of the engine is connected, through a propeller shaft extending through the interior of the rear fork 3 and carrying a cam type torque damper 9, to an input shaft 8 of a bevel gear mechanism 7 connected to the rear wheel 4.

The torque damper 9 comprises a rear side damper cam 9a and a front side lifter 9c which is urged to be in pressure contact therewith by a spring 9b. The lifter 9c is in splined engagement with the propeller shaft 10 so as to be axially slidable therealong. The damper cam 9a is connected, at its rearward end portion, to the input shaft 8 through a spherical joint type universal joint 11 so that, by relative rotations of the damper cam 9a and the lifter 9c caused by a torque change, the lifter 9c is pushed by the damper cam 9a to be moved axially and forwards against the action of the spring 9b as shown by dotted lines in FIG. 6 so that the torque change is absorbed.

The construction as above is not especially different from that of the foregoing conventional apparatus. However, according to this invention, an outer casing 12, which extends over the periphery of the damper 9 for enclosing the same liquid-tightly, is so attached to the propeller shaft 10 as to be rotated therewith.

More in detail, the outer casing 12 comprises a tubular frame casing extending longitudinally in the axial direction so as to surround the torque damper 9. The casing 12 is attached at its front end portion, through a sealing ring, to the propeller shaft 10 so as to be rotated therewith and is mounted, at its rear end portion, on the periphery of the damper cam 9a through a front side guide ring 13 made of nylon and a rear side seal ring 14 made of rubber so as to be supported thereon. Thus, the torque damper 9 will be well lubricated during operation by oil which is sealed in the outer casing 12.

The fundamental construction of this invention is as described above and, in the illustrated example, the universal joint 11 is provided with a surrounding outer cover 15 covering the same liquid-tightly. The interior of the outer cover 15 is in communication with the interior of the outer casing 12 so that the universal joint 11 may be lubricated with the oil in the outer casing 12.

More in detail, the outer cover 15 is provided in a gear case 16 for the foregoing bevel gear mechanism 7. Between the gear case 16 and the universal joint 11 is formed an oil chamber 18 defined by front and rear seal rings 17, 17. The oil chamber 18 is brought into communication with the interior of the outer casing 12 through a communication passage 19. The passage 19 comprises a radial directional opening 19a which is in communication with the interior of the oil chamber 18 and extends radially inwards, and a center axial bore 19b which is in communication with the opening 19a and extends axially in the input shaft 8. The interior of the axial bore 19b is in communication with the interior of the outer casing 12 through a front open end thereof and a radially side opening 19c, and is in communication with the interior of the casing 12 through a center axial opening 19d in the propeller shaft 10 and a radially side opening 19e. An oil filler opening 20 is made in the gear case 16 for charging oil into the oil chamber 18 from the exterior. The opening 20 is closed in an ordinary case by a bolt 21 screwed thereinto.

With this arrangement, only small increases in temperature of the oil in the outer casing 12 occur. Deterioration of the oil by heat is prevented because of the increase of the amount of oil caused by the communication of the outer casing 12 with the outer cover 15.

Figure 5:
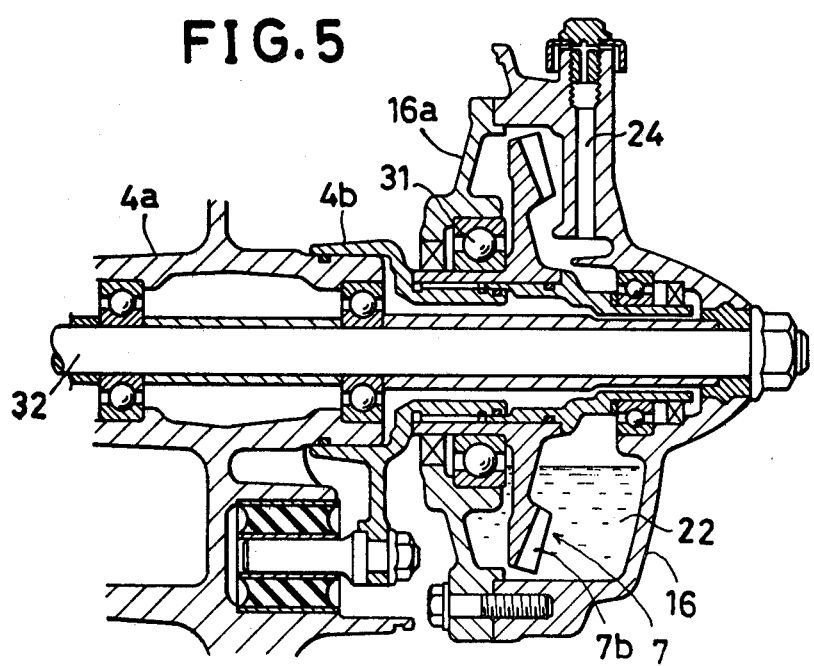
FIG. 5 is a sectional view taken along the lines V—V of FIG. 4.
Figure 6:
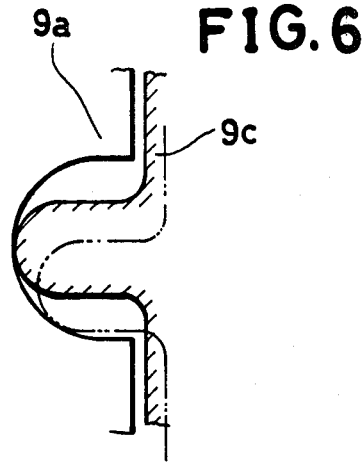
FIG. 6 is a diagrammatic view for explaining the operation of a torque damper of the present invention.
Figure 7:
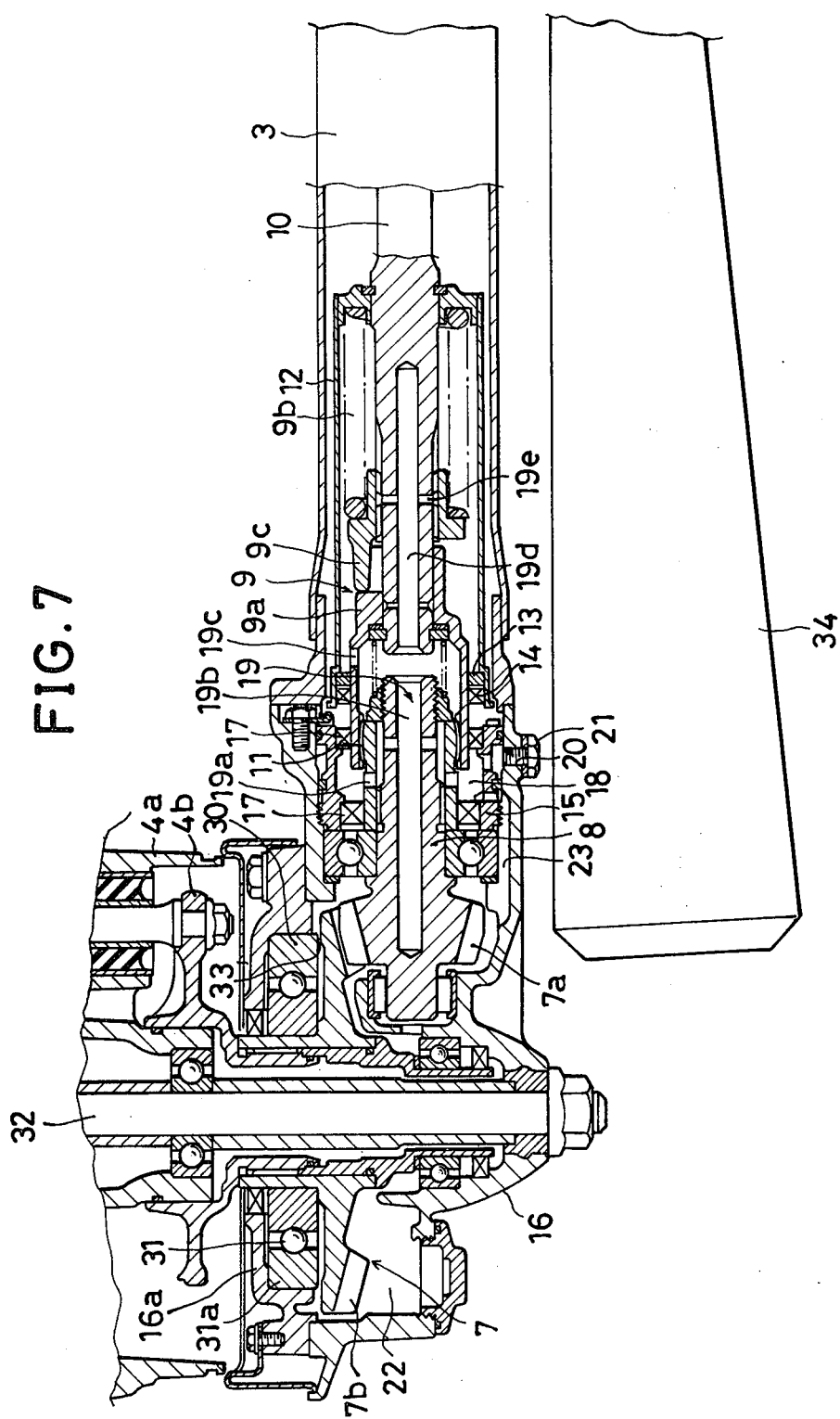
FIG. 7 is a sectional plan view of a modified example of the present invention.

The amount of oil can be further increased if the gear case 16 covering the bevel gear mechanism 7 liquid-tightly is brought into communication with the outer casing 12. More in detail, an oil chamber 22 formed in the gear case 16, as shown clearly in FIG. 5, is brought into communication with the interior of the oil chamber 18 in the outer cover 15 through a communication passage 23 as shown in FIG. 7, for instance. This arrangement is advantageous in that deterioration of the oil can be prevented more effectively and only a single oil filler opening 20 may be enough, common to the two oil chambers 18, 22 which may be made, for instance, in the gear case 16. This is similarly applicable to a bleed passage 24.

Figure 8:
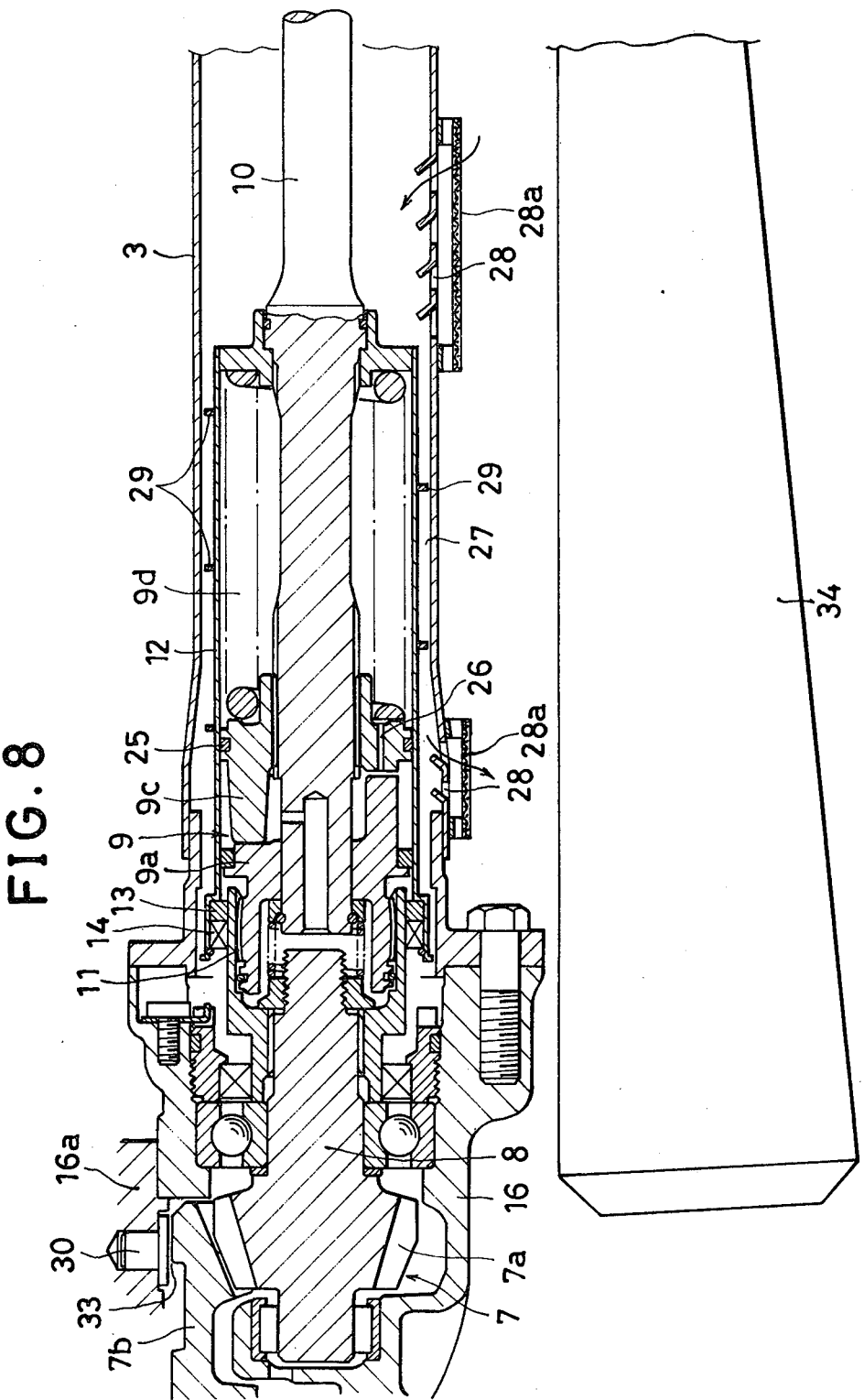
FIG. 8 is a sectional plan view of another modified example of the present invention.

The foregoing torque damper 9 is such that, when the same is acted by a large torque change owing to a rapid deceleration or the like, a rapid forward movement of the lifter 9c is made and the same acts as a trigger for causing the lifter 9c to make a self-exciting vibration. For preventing this, accordingly, it can be considered that the damper 9 can additionally have an oil pressure damper function which damps the axially forward and rearward movements of the lifter 9c. Namely, as shown in FIG. 8, the lifter 9c is in slide contact with the inner circumferential surface of the outer casing 12 through a piston ring 25 and is also provided with an orifice opening 26 axially made therethrough so that, owing to a viscous resistance of the oil flowing through the orifice opening 26, the vibration energy of the lifter 9c can be absorbed to prevent generation of the self-exciting vibration thereof. In this manner, any torque change can be absorbed smoothly.

Figure 9:
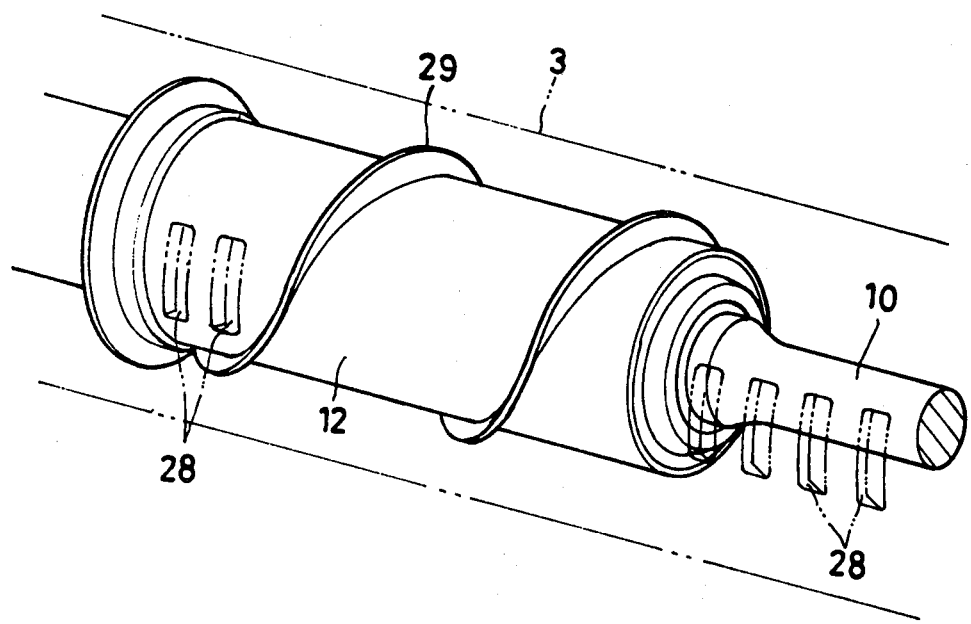
FIG. 9 is a perspective view of a portion of the present invention.

Also with this arrangement, the oil in the outer casing 12 is apt to be raised in temperature. Accordingly, in the illustrated example, a ventilation gap 27 is formed between the outer periphery of the outer casing 12 and the rear fork 3. The rear fork 3 is provided with front and rear ventilation openings 28, 28 for introducing external air into the ventilation gap 27 so that the oil may be cooled by the current of the air. Additionally, the outer peripheral surface of the outer casing 12 is provided with a radiation fin 29 of spiral form or the like as shown clearly in FIG. 9, for instance, so that the cooling capacity thereof may be further improved. Numeral 28a denotes a protective net applied to each ventilation opening 28.

The foregoing air cooling means is also effective when provided on the embodiments using a damper 9 which does not have an oil pressure damper function as shown in FIGS. 4 or 7. In these cases, if the outer casing 12 is provided with the radiation fin 29, even where the rear fork 3 is not provided with the ventilation openings 28, 28, the air in the rear fork 3 is agitated by the spiral fin 29 at the time of the rotation of the casing 12 caused by the rotation of the propeller shaft 10 so that the heat from the casing 12 is effectively dissipated outside from the whole peripheral surface of the rear fork 3 through the air. In this manner, a desired cooling action can be given.

In the illustrated example, the bevel gear mechanism 7 is also improved. Namely, the bevel gear mechanism 7 comprises a pinion gear 7a provided in the gear case 16 connected to the input shaft 8, and a bevel gear 7b meshed therewith connected to the rear wheel 4. The bevel gear 7b and the pinion gear 7a are disposed respectively on the inside near the rear wheel 4 and on the outside. The rear case 16 is provided with a covering member 16a for covering the bevel gear 7b from the inside thereof. The covering member 16a has a restriction member 30 for restricting an inward deflection of the bevel gear 30.

The above will be described below in more detail with reference to the example shown in FIG. 4. The bevel gear 7b is is mounted in, and supported by, the covering member 16a through a roller bearing 31 mounted on the periphery of a portion of a tubular shaft 32 that extends inwards from the gear 7b. The tubular shaft 32 is in splined engagement with a driven flange 4b connected to a wheel hub 4a on an axle 32 for the rear wheel 4. The restriction member 30 comprising a pin is press-fitted into the covering member 16a and is positioned to face the circumferentially outer portion of the inside surface of the bevel gear 7b with a slight gap 33 formed therebetween.

It is preferable that the bevel gear 7b be comparatively small in thickness and light in weight for decreasing a load applied below a spring of the rear wheel 4 but, in this respect, when the bevel gear 7b is applied with a large load resulting from the engagement thereof with the pinion gear 7a, a comparatively large deflection is brought about at its engaging portion so that the mutual engagement relation between the gears 7a, 7b becomes bad. For this reason, the restriction member 30 is provided as described above for restricting the deflection of the bevel gear 7b.

In the arrangement that the restriction member 30 is press-fitted into the covering member 16a as described above, if the covering member 16a is deformed by heat a loosening of the fit of the member can occur and the foregoing gap 33 is liable to vary in distance. This is especially remarkable when the covering member 16a is made of aluminum material. Therefore, for keeping the heat of an exhaust pipe 34 on the outside of the covering away from the restriction member 30, the bevel gear 7b is disposed inside the pinion gear 7a and the covering member 16a is provided inside the bevel gear 7b.

The restriction member 30 is not limited to that shown in FIG. 4, but may be constructed by using the foregoing rolling bearing 31 supported on a covering member 16a for supporting the bevel gear 7b as shown in FIG. 7, for instance. Namely, an outer member 31a of the bearing 31 is supported, at its inside surface, on the rear wheel 4 side, by the covering member 16a and, as to face, at its outside surface, the peripheral portion of the inside surface of the bevel gear 7b, while the slight gap 33 is formed therebetween. Thus, the outer member 31a is used also for the restriction member 30. Consequently, the number of constructional parts can be decreased and the construction can be simplified.

In the above examples, the propeller shaft 10 is provided on the left-handed side portion of the rear fork 3 as viewed from a driver.

FIG. 10 shows another embodiment of the present invention, and in this embodiment the propeller shaft 10 is provided on the opposite right side portion, that is, the right-handed side of the rear fork 10.

Thus, according to this invention, the torque damper is provided on the periphery thereof with the outer casing for being lubricated with the oil confined in the casing, so that there can be removed the foregoing inconveniences with the conventional apparatus of the type that the torque damper is lubricated with the oil confined in the rear fork.

It is readily apparent that the above-described shaft drive apparatus for motorized two-wheel vehicle meets all of the objects mentioned above and also has the advantage of wide commercial utility. It should be understood that the specific forms of the invention hereinabove described are intended to be representative only as certain modifications within the scope of these teachings will be apparent to those skilled in the art.

Accordingly, reference should be made to the following claims in determining the full scope of the invention.

What is claimed is:

1. In a shaft drive apparatus in a two-wheeled vehicle which includes a vehicle body having a middle portion; front wheel mounted on the body; a rear fork mounted on the body; an internal combustion engine having an output shaft mounted on said middle portion; and a rear wheel mounted on said rear fork; the shaft driving apparatus including: a bevel gear mechanism having a gear casing and an input shaft connected to said rear wheel; a propeller shaft having opposite ends with one end connected to said output shaft and the other end extending axially into said rear fork; and a torque damper interconnecting said other end to said input shaft; the improvement comprising an outer casing extending over and liquid-tightly enclosing said torque damper, said casing being attached to said propeller shaft to rotate therewith.

2. The shaft drive apparatus of claim 1 further comprising a universal joint interconnecting said torque damper and said input shaft and an outer cover extending over and liquid-tightly surrounding said universal joint, said outer cover engaging said outer casing and having an interior in communication with an interior of said outer casing.

3. The shaft drive apparatus of claim 1 wherein said gear casing has an interior in communication with an interior of said outer casing.

4. The shaft drive apparatus of any one of claims 1, 2 or 3 wherein said torque damper includes a lifter slidably mounted on said propeller shaft having an outer peripheral surface in sliding contact with an inner peripheral surface of said outer casing and an orifice opening extending axially therethrough.

5. The shaft drive apparatus of claim 4 wherein a ventilation gap is formed between an outer peripheral surface of said outer casing and an inner peripheral surface of said rear fork, and said rear fork is provided with at least one ventilation opening for introducing external air into said gap.

6. The shaft drive apparatus of any one of claims 1, 2 or 3 wherein a ventilation gap is formed between an outer peripheral surface of said outer casing and an inner peripheral surface of said rear fork, and said rear fork is provided with at least one ventilation opening for introducing external air into said gap.

7. The shaft drive apparatus of claim 5 wherein said outer casing includes radially extending radiation fins on an outer periphery thereof.

8. The shaft drive apparatus of claim 6 wherein said outer casing includes radially extending radiation fins on an outer periphery thereof.

9. The shaft drive apparatus of any one of claims 1, 2 or 3 wherein said outer casing includes radially extending radiation fins on an outer periphery thereof.

10. The shaft drive apparatus of any one of claims 1, 2 or 3 wherein said bevel gear mechanism comprises a pinion gear connected to said input shaft, a bevel gear meshed with said pinion gear and connected to said rear wheel, said pinion gear and said bevel gear being positioned in said gear casing such that said bevel gear is axially inwardly of said pinion gear relative to said rear wheel and said gear casing includes a covering member extending to cover said bevel gear on a side between said bevel gear and said rear wheel, and a restriction member mounted in said covering member for restricting axial deflection of said bevel gear.

11. The shaft drive apparatus of claim 4 wherein said bevel gear mechanism comprises a pinion gear connected to said input shaft, a bevel gear meshed with said pinion gear and connected to said rear wheel, said pinion gear and said bevel gear being positioned in said gear casing such that said bevel gear is axially inwardly of said pinion gear relative to said rear wheel and said gear casing includes a covering member extending to cover said bevel gear on a side between said bevel gear and said rear wheel, and a restriction member mounted in said covering member for restricting axial deflection of said bevel gear.

12. The shaft drive apparatus of claim 7 wherein said bevel gear mechanism comprises a pinion gear connected to said input shaft, a bevel gear meshed with said pinion gear and connected to said rear wheel, said pinion gear and said bevel gear being positioned in said gear casing such that said bevel gear is axially inwardly of said pinion gear relative to said rear wheel and said gear casing includes a covering member extending to cover said bevel gear on a side between said bevel gear and said rear wheel, and a restriction member mounted in said covering member for restricting axial deflection of said bevel gear.

13. The shaft drive apparatus of claim 8 wherein said bevel gear mechanism comprises a pinion gear connected to said input shaft, a bevel gear meshed with said pinion gear and connected to said rear wheel, said pinion gear and said bevel gear being positioned in said gear casing such that said bevel gear is axially inwardly of said pinion gear relative to said rear wheel and said gear casing includes a covering member extending to cover said bevel gear on a side between said bevel gear and said rear wheel, and a restriction member mounted in said covering member for restricting axial deflection of said bevel gear.

14. The shaft drive apparatus of claim 9 wherein said bevel gear mechanism comprises a pinion gear connected to said input shaft, a bevel gear meshed with said pinion gear and connected to said rear wheel, said pinion gear and said bevel gear being positioned in said gear casing such that said bevel gear is axially inwardly of said pinion gear relative to said rear wheel and said gear casing includes a covering member extending to cover said bevel gear on a side between said bevel gear and said rear wheel, and a restriction member mounted in said covering member for restricting axial deflection of said bevel gear.

15. The shaft drive apparatus of claim 10 wherein said restriction member comprises an outer annular member of a rolling bearing carried by said covering member.

16. The shaft drive apparatus of claim 11 wherein said restriction member comprises an outer annular member of a rolling bearing carried by said covering member.

17. The shaft drive apparatus of claim 12 wherein said restriction member comprises an outer annular member of a rolling bearing carried by said covering member.

18. The shaft drive apparatus of claim 13 wherein said restriction member comprises an outer annular member of a rolling bearing carried by said covering member.

19. The shaft drive apparatus of claim 14 wherein said restriction member comprises an outer annular member of a rolling bearing carried by said covering member.

* * * * *